United States Patent [19]

Matsubara et al.

[11] Patent Number: 5,475,459
[45] Date of Patent: Dec. 12, 1995

[54] BLADE TYPE FOCAL PLANE SHUTTER WITH IMPROVED ARM CONSTRUCTION

[75] Inventors: Takashi Matsubara, Yokohama; Masayuki Kanamuro, Kawasaki; Masanori Hasuda, Yokohama, all of Japan

[73] Assignee: Nikon Corporation, Tokyo, Japan

[21] Appl. No.: 365,183

[22] Filed: Dec. 28, 1994

Related U.S. Application Data

[63] Continuation of Ser. No. 247,391, May 23, 1994, abandoned, which is a continuation of Ser. No. 21,071, Feb. 23, 1993, abandoned.

[30] Foreign Application Priority Data

Mar. 3, 1992 [JP] Japan .................................. 4-081709

[51] Int. Cl.⁶ ...................................................... G03B 9/40
[52] U.S. Cl. ............................................ 354/246; 359/234
[58] Field of Search .................................. 354/245, 246, 354/247, 248, 249; 359/234, 321, 324

[56] References Cited

U.S. PATENT DOCUMENTS 4,560,265  12/1985  Hashimoto .............................. 354/246

Primary Examiner—Howard B. Blankenship
Attorney, Agent, or Firm—Shapiro and Shapiro

[57] ABSTRACT

A blade type focal plane shutter is designed to decrease the shutter charge energy and to improve the durability of the shutter without decreasing the impact resistance of the main arms of the shutter. The shutter may comprise a shutter base plate having an aperture; shutter blades each composed of a plural number of blade segments and a driving mechanism having main arms and follower arms rotatably connected to the shutter base plate and blade segments as to form a parallel link mechanism, the main arms having pin-receiving holes in which driving pins are engaged respectively. Through the driving pins, the driving mechanism is able to move the blade segments between the aperture opening position in which the blade segments are folded up outside the aperture and the aperture closing position in which the blade segments are expanded to cover the aperture. The follower arms are decreased in rigidity and/or impact resistance or in thickness relative to the main arms.

3 Claims, 3 Drawing Sheets

*FIG. 5*

| EXEMPLARY CHARACTERISTICS OF FOLLOWER ARMS RELATIVE TO MAIN ARMS ||
| --- | --- |
| EXAMPLE | CHARACTERISTIC |
| 1 | LOWER RIGIDITY AND/OR IMPACT RESISTANCE |
| 2 | SMALLER PLATE THICKNESS |
| 3 | LIGHTER WEIGHT PER VOLUME | ps
BLADE TYPE FOCAL PLANE SHUTTER WITH IMPROVED ARM CONSTRUCTION

This is a continuation of application Ser. No. 08/247,391, filed May 23, 1994, which is a continuation of application Ser. No. 08/021,071, filed Feb. 23, 1993, both abandoned.

BACKGROUND OF THE INVENTION

1. Field of the Invention

The present invention relates to a focal plane shutter of the type in which the leading and the trailing shutter blades are composed of a plural number of blade segments arranged near the exposing aperture.

2. Related Background Art

With the improvement of the film sensitivity and the wish for new types of image representation in the art, there is an increasing desire for further increase of the shutter speed of the camera. In fact, there has already been realized such a high speed camera by which a shutter speed up to 1/8000 sec. is possible.

In principle, the prior art focal plane shutters have a structure comprising a base plate, arms rotatably connected to the base plate and blade segments consituting the leading and trailing shutter blades to be driven through the arms. The arms include main arms and follower arms. The main and follower arms are so rotatably connected as to form a parallel link mechanism. Every main arm has a pin-receiving hole in which a driving pin is engaged. Through the driving pins, a driving mechanism can move the blade segments between the aperture opening position and the aperture closing position. In the aperture opening position, the blade segments are folded up outside the aperture. In the aperture closing position, the blade segments are expanded to cover the aperture.

In the prior art focal plane shutters as mentioned above, it is a common practice to use the same quality of material having the same plate thickness for both the main arm and the follower arm, taking into account the running balance of the arms.

As readily understood, in order to attain such a very high shutter speed of 1/8000 sec. or over, a further reduction of weight is absolutely necessary for the prior art focal plane shutter. Only the reduction of weight of the blade segments is insufficient for this purpose. The weight of the arms also must be reduced as much as possible. However, the weight reduction of main arms involves a difficult problem that the impact resistance of the main arms must be adequately maintained at the same. Thus, two conflicting problems of light weight and adequate impact resistance must be solved at the same time. For example, if the plate thickness of the main arm is decreased for the purpose of weight reduction only, there may be produced such main arm which is no longer resistant against the impact applied to it by a stopper or braking element. Since the shutter element is stopped by its collision against the braking element, the repeating impact will have the adverse effect to widen the pin-receiving hole which is the driving power transmission part of the arm. It is known in the art that such widening of the pin-receiving hole on the main arm brings about a decrease of the accuracy of the exposure time due to time lag. The time lag is caused by the fact that when the shutter is operated, the start of the main arms is delayed relative to the start of the driving pins in the widened pin-receiving holes.

SUMMARY OF THE INVENTION

Accordingly, a principal object of the invention is to provide an improved focal plane shutter with which the energy required for charging the shutter can be reduced and the durability of the shutter can be improved without any decrease of the impact resistance of the main arms.

The above object is attained by the focal plane shutter as shown in the accompanying drawings.

The focal plane shutter according to the present invention comprises a shutter base plate 30 having an aperture 30a; shutter blades 10 and 20 composed of blade segments 11 to 14 and 21 to 24 respectively; main arms 16 and 26 having pin-receiving holes 16a and 26a and follower arms 15 and 25, said main arms and follower arms being so rotatably connected to the shutter base plate and the blade segments as to form a parallel link mechanism; driving pins 31 and 32 engaged in the pin-receiving holes 16a and 26a respectively; and driving mechanisms 19 and 29 for driving the shutter blade segments through the driving pins to move the blade segments between the aperture opening position in which the blade segments are folded up outside the aperture and the aperture closing position in which the blade segments are expanded to cover the aperture, which focal plane shutter is characterized in that the rigidity and/or impact resistance of the follower arms 15 and 25 is lower than that of the main arms 16 and 26.

In another aspect of the invention, the focal plane shutter according to the present invention comprises a shutter base plate 30 having an aperture 30a; shutter blades 10 and 20 composed of blade segments 11 to 14 and 21 to 24 respectively; main arms 16 and 26 having pin-receiving holes 16a and 26a and follower arms 15 and 25, said main arms and follower arms being so rotatably connected to the shutter base plate and the blade segments as to form a parallel link mechanism; driving pins 31 and 32 engaged in the pin-receiving holes 16a and 26a respectively; and driving mechanisms 19 and 29 for driving the shutter blade segments through the driving pins to move the blade segments between the aperture opening position in which the blade segments are folded up outside the aperture and the aperture closing position in which the blade segments are expanded to cover the aperture, which focal plane shutter is characterized in that the thickness of the follower arms 15 and 25 is smaller than that of the main arms 16 and 26.

According to the present invention, the weight reduction of the focal plane shutter is realized by putting great emphasis on the weight reduction of the follower arms which have no driving pin-receiving holes (there is no need of worrying about the above-mentioned widening of holes). Thus, the energy required for charging the shutter is decreased by decreasing the weight of the follower arms. As the result, a super-high speed shutter over 1/8000 sec. can be realized by the present invention.

On the other hand, according to present invention, for the main arms which have driving pin-receiving holes, it is allowed to select such material and thickness adequately resistant against the impact by the stopper. Thus, the above-mentioned problem that the accuracy of the exposure time may be decreased by the widening of the pin-receiving holes can be obviated and, as the result, a further improvement in durability of the focal plane shutter can be attained.

The weight reduction of the follower arms which is the important feature of the invention can be attained in various ways.

For example, it may be attained by making the follower arms from a different-material (especially in respect to rigidity and/or impact resistance) from that used for the main arms. The material of the follower arms may preferably be of lighter weight per volume than that of the main arms.

In another embodiment, it is attained by selecting, for the follower arms, a smaller thickness than that of the main arms.

In a further embodiment, both of the material and the thickness of the follower arms may be changed from those of the main arms.

BRIEF DESCRIPTION OF THE DRAWINGS

FIG. 5 is a chart showing examples of preferred characteristics of the follower arms relative to the main arms, in accordance with the invention.

DESCRIPTION OF THE PREFERRED EMBODIMENTS

The present invention will be described in detail with reference to the accompanying drawings showing the preferred embodiments of the present invention. Examples of preferred characteristics of the follower arms relative to the main arms are given in FIG. 5.

Figure 1:
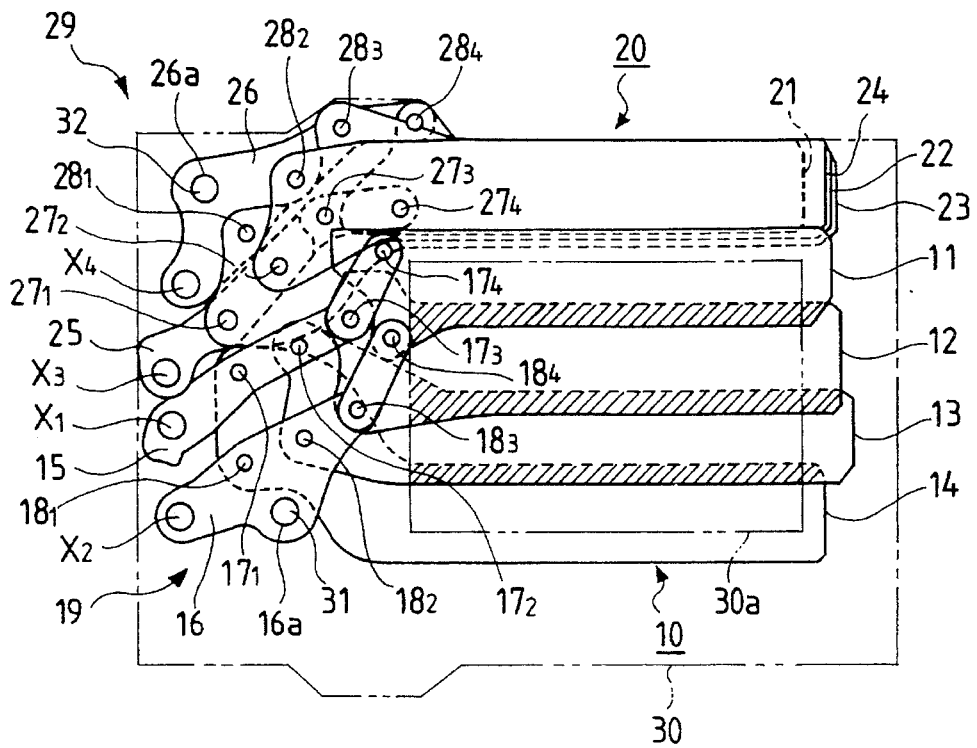
FIG. 1 is a front view of an embodiment of the focal plane shutter according to the present invention, the segments of the leading shutter blade being expanded to cover the aperture.
Figure 2:
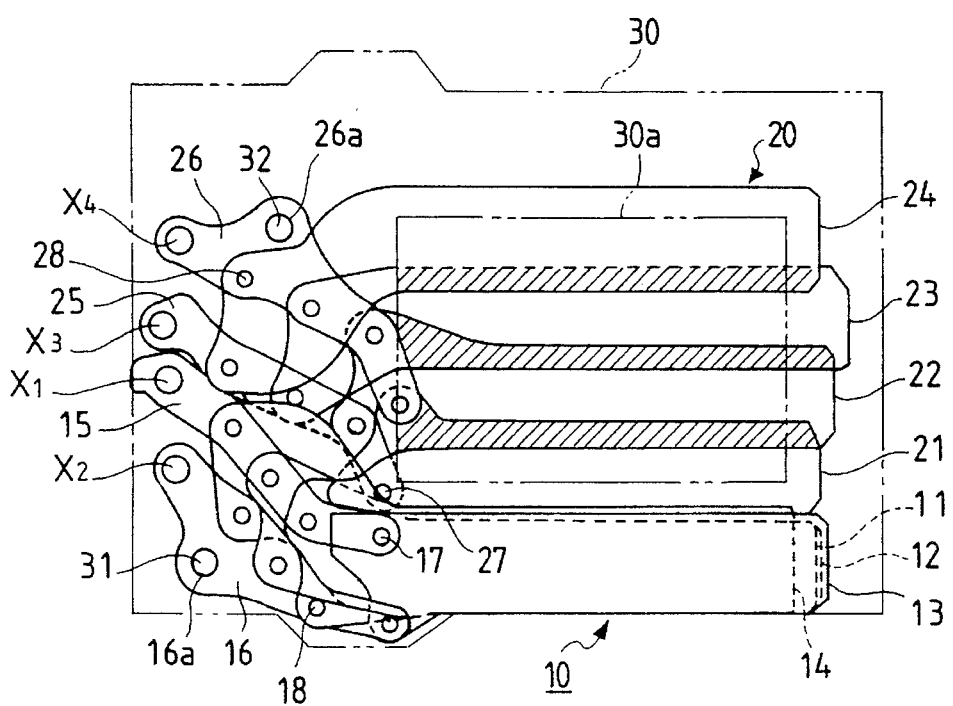
FIG. 2 is the same view of the embodiment, but in another position where the segments of the trailing shutter blade are expanded to cover the aperture.
Figure 3:
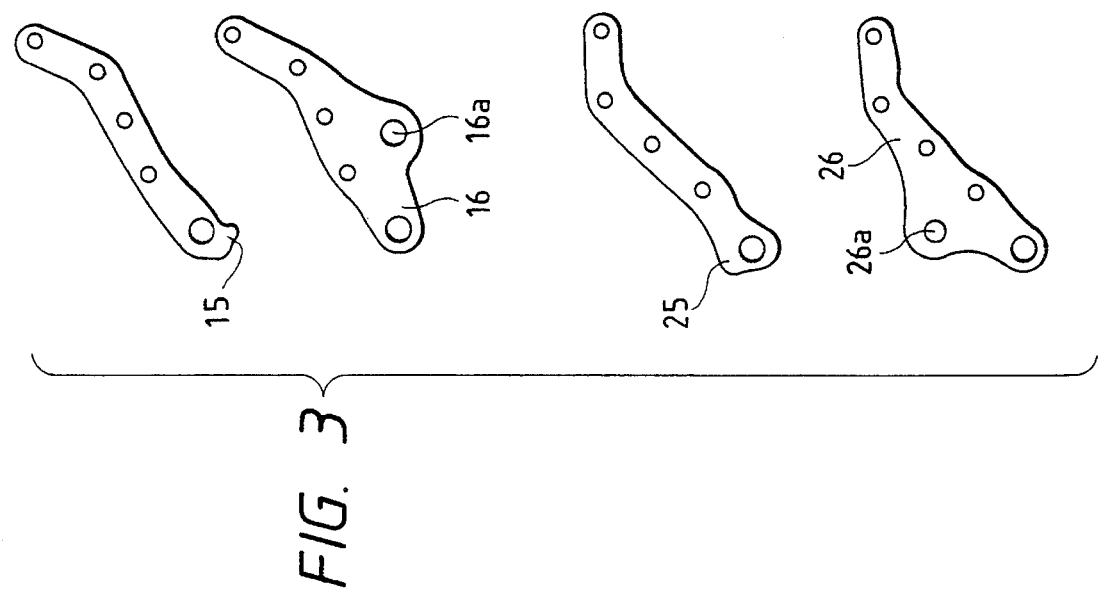
FIG. 3 is a front view showing the main arms and follower arms of the focal plane shutter in the above-shown embodiment.

A first embodiment of the focal plane shutter according to the present invention is shown in FIGS. 1 and 2, and the forms of the main arms and follower arms in the embodiment are clearly shown in FIG. 3.

In this embodiment, the focal plane shutter comprises a leading shutter blade 10, a trailing shutter blade 20 and a shutter base plate 30.

The leading shutter blade 10 is composed of four segments 11 to 14. These blade segments 11 to 14 are supported by a follower arm 15 and a main arm 16. The arms 15 and 16 are rotatable about axes $X_1$ and $X_2$ formed as stud pins on the base plate 30. The blade segments 11 to 14 are rotatably connected to the arms 15 and 16 through self-locking pins $17_1$ to $17_4$ and $18_1$ to $18_4$ respectively.

The main arm 16 has a pin-receiving hole 16a in which a driving pin 31 is engaged. When the shutter is actuated, a shutter-driving mechanism known per se drives the driving pin 31 through which the leading shutter blade 10 is moved to open and close the aperture for exposure.

Similarly, the trailing shutter blade 20 is composed of four segments 21 to 24. These blade segments 21 to 24 are supported by a follower arm 25 and a main arm 26. The arms 25 and 26 are rotatable about axes $X_3$ and $X_4$ formed as stud pins on the base plate 30. The blade segments 21 to 24 are rotatably connected to the arms 25 and 26 through self-locking pins $27_1$ to $27_4$ and $28_1$ to $28_4$ respectively.

The main arm 26 has a pin-receiving hole 26a in which a driving pin 32 is engaged. When the shutter is actuated, a shutter-driving mechanism known per se drives the driving pin 32 through which the trailing shutter blade 20 is moved to open and close the aperture for exposure. The arms 15, 16, axes $X_1$, $X_2$, self-locking pins 17, 18 and the driving pin 31 constitute together the driving mechanism 19 for moving the blade segments 11 to 14. The arms 25, 26, axes $X_3$, $X_4$, self-locking pins 27, 28 and the driving pin 32 constitute together the driving mechanisms 29 for moving the blade segments 21 to 24.

The main arms 16, 26 and the follower arms 15, 25 are so rotatably connected to the shutter base plate 30 and the blade segments 11 to 14 and 21 to 24 as to form a parallel link mechanism. Thus, the blade segments 11 to 14 and 21 to 24 can be moved in parallel to the exposing aperture 30a formed in the shutter base plate 30.

FIG. 1 shows the focal plane shutter in the position where the segments 11 to 14 of the leading shutter blade 10 have been expanded to cover the aperture 30a and the segments 21 to 24 of the trailing shutter blade 20 have been folded up in the upper area outside the aperture 30a.

When the driving mechanisms 19 and 29 are driven starting from the above-shown position, the main arms 16 and 26 are moved up to the positions shown in FIG. 2 by the driving pins 31 and 32 engaged in the holes 16a and 26a. After the running of the shutter blades, as shown in FIG. 2, the segments 21 to 24 of the trailing blade 20 get expanded to cover the aperture 30a and the segments 11 to 14 of the leading blade 10 get folded up in the lower area outside the aperture 30a.

In this embodiment, the arms 15, 16, 25, 26 have the same shapes in plan view as those of the arms of the prior art focal plane shutter. But, the follower arms 15, 25 differ from the main arms 16, 26 in weight. According to the present invention, the weight of the follower arms is considerably decreased relative to the main arms.

For the present embodiment, the weight reduction of the follower arms has been attained by changing the material and/or the thickness of the plate from which the arms have been made, as shown in the following manufacturing examples.

As the first mode, the main arms 16, 26 and the follower arms 15, 25 were made from different materials.

MANUFACTURING EXAMPLE 1 main arms 16, 26 material: Ti (titanium plate, treated by nitriding) plate thickness: 150 μm follower arms 15, 25 material: Al(aluminum plate) plate thickness: 150 μm

MANUFACTURING EXAMPLE 2 main arms 16, 26 material: Ti(titanium plate, treated by nitriding) plate thickness: 150 μm follower arms 15, 25 material: CFRP plate thickness: 150 μm

MANUFACTURING EXAMPLE 3 main arms 16, 26 material: Ti(titanium plate, treated by nitriding) plate thickness: 150 μm follower arms 15, 25 material: HFRP plate thickness: 150 μm

* HFRP is a hybrid FRP comprising carbon fibre and KEBLER (trade name) fibre.

As the second mode, the main arms 16, 26 and the follower arms 15, 25 were made from the same kind of material, but changing the thickness.

MANUFACTURING EXAMPLE 4 main arms 16, 26
   material: Ti(titanium plate, treated by nitriding) plate thickness: 150 μm
follower arms 15, 25
   material: Ti(titanium plate, treated by nitriding) plate thickness: 100 μm

MANUFACTURING EXAMPLE 5 main arms 16, 26
   material: Al plate thickness: 200 μm
follower arms 15, 25
   material: Al plate thickness: 150 μm As the third mode, the main arms 16, 26 and the follower arms 15, 25 were prepared changing not only the kind of material but also the plate thickness.

MANUFACTURING EXAMPLE 6 main arms 16, 26: Ti(treated by nitriding), thickness 150 μm
follower arms 15, 25: Al, thickness 100 μm For the sake of comparison, the main arms 16, 26 and the follower arms 15, 25 were made from the same kind of material having the same plate thickness according to the prior art.

COMPARATIVE EXAMPLE 1 main arms 16, 26: Ti (treated by nitriding), thickness 150 μm
follower arms 15, 25: Ti(treated by nitriding), thickness 150 μm For the arms prepared by the above manufacturing examples 1 to 6, the shutter charge energy was measured and the measured value was compared with the measured value of that of the comparative example 1 to calculate the charge energy ratio. The results are as follows:

|  | Main Arms | Follower Arms | Charge Energy Ratio |
| --- | --- | --- | --- |
| Mfg. Example 1 | Ti/150 μm | Al/150 μm | 0.96 |
| Mfg. Example 2 | Ti/150 μm | CFRP/150 μm | 0.93 |
| Mfg. Example 3 | Ti/150 μm | HFRP/150 μm | 0.93 |
| Mfg. Example 4 | Ti/150 μm | Ti/100 μm | 0.96 |
| Mfg. Example 5 | Al/200 μm | Al/150 μm | 0.93 |
| Mfg. Example 6 | Ti/150 μm | Al/100 μm | 0.93 |
| Comp. Example 1 | Ti/150 μm | Ti/150 μm | 1.00 |

In the focal plane shutter according to the prior art, the main arms 16, 26 for which the impact resistance is highly required and the follower arms 15, 25 for which the impact resistance is less required have been made from the same kind of material having the same plate thickness. Therefore, it has been difficult to decrease the required charge energy by way of the weight reduction of the arms while keeping the durability of the shutter.

So long as the leading shutter blade and the trailing shutter blade are entirely the same, the charge energy means the energy required for driving the main arms 16, 26 and the follower arms 15, 25. From the above data of the charge energy ratio for the manufacturing examples 1 to 6, it is seen that weight reduction of from 4 to 6 percent has been attained. This means that the shutter speed can be increased up to the same degree by using the same amount of charge energy as required before.

For the sake of further comparison, as Comparative Example 2, the main arms 16, 26 and the follower arms 15, 25 were prepared using the same kind of material having the same plate thickness in such manner that the shutter of this comparative example could attain approximately the same charge energy ratio as that of the above manufacturing example 2 (the charge energy ratio=0.93).

COMPARATIVE EXAMPLE 2 main arms 16, 26: CFRP, thickness 150 μm
follower arms 15, 25: CFRP, thickness 150 μm The shutter manufactured using the arms of the above comparative example 2 (the main arms 16, 26: CFRP/150 μm and the follower arms 15, 25:CFRP/150 μm) was subjected to a performance test where the shutter is operated repeatedly 5000 to 20000 cycles at a relatively low speed, that is, at the blade speed= 2.9 msec. Although the speed was relatively low, there occurred some troubles. Particularly, the widening of pin-receiving holes 16a and 26a was remarkable on the main arms 16 and 26 after 5000 to 20000 cycles of shutter operation. Herein, the "blade speed" means the time required for the shutter blade to pass through the aperture.

The same performance test was conducted also for the shutter of the manufacturing example 2 of the present invention. Even after 150,000 cycles of blade running at a higher blade speed of 2.5 msec., there was observed no trouble. The accuracy of exposure time never decreased even after so many cycles of shutter operation.

The shutters of the manufacturing examples 1 and 3 to 6 were also subjected to the same performance test under the same condition. Good test results similar to that of the manufacturing example 2 were obtained. No trouble was observed for all the shutters.

Figure 4:
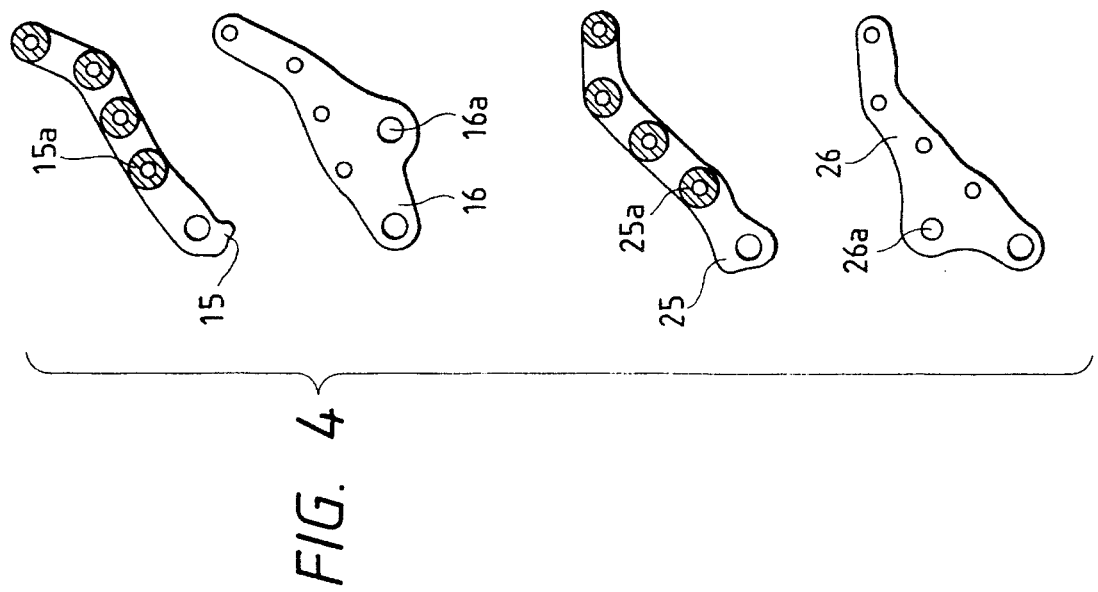
FIG. 4 is a front view showing the main arms and follower arms of the focal plane shutter in another embodiment.

FIG. 4 shows another embodiment of the arms in the focal plane shutter according to the present invention.

When the main arms 16, 26 and the follower arms 15, 25 have different thicknesses, there may happen such trouble that the running performance of the shutter varies from lot to lot of the shutter unit.

To avoid such trouble, in the embodiment shown in FIG. 4, the follower arms 15, 25 have portions 15a, 25a whose thickness is locally increased. The thicker portions (hatched portions in FIG. 4) are connecting portions to which the blade segments 11 to 14 and 21 to 24 are connected respectively. The thicker connecting portions 15a and 25a may be formed by printing or etching.

As a modification, the thickness of the head of the connection pin may be changed to compensate the reduced thickness of the follower arms.

Although the invention has been particularly described with reference to preferred embodiments thereof, it is to be understood that various modifications are possible in the light of the above teachings. For example, when aluminum is used for arms, the aluminum plate material may be coated with Ni or subjected to Alumite treatment to compensate for low strength of the material.

In the above embodiments, all of the arms of manufacturing examples 1 to 6 have proved to be good in durability even when the shutter is operated at the blade speed=2.5 msec. However, in order to realize such a high speed shutter over the blade speed=2.5 msec, the arms will be required to have higher rigidity and abrasion resistance.

The requirement may be satisfied by employing different materials and different thicknesses for the main arms and for the follower arms without changing the charge energy ratio.

For example, one can select Ti/180 μm for main arms and Al/180 μm for follower arms. The charge energy required for the shutter with the main arms of Ti/180 μm and the follower arms of Al/180 μm is approximately equal to the charge energy for the shutter with the main arms Ti/150 μm and the follower arms of Ti/150 μm. Even when the blade speed is increased up over the blade speed=2.5 msec., there may be assured adequate durability for such a high speed shutter.

As readily understood from the foregoing, the present invention has provided a light weight focal plane shutter by reducing mainly the weight of the follower arms which have no driving pin-receiving hole while keeping adequate rigidity and impact resistance for the main arms which have driving pin-receiving holes.

The weight reduction of the follower arms is attained by changing the kind of material and/or the plate thickness of the follower arms from those of the main arms.

Since the main arms have sufficient rigidity and impact resistance to prevent the pin-receiving holes from being widened by impact, the focal plane shutter according to the invention involves no trouble of decreased accuracy of exposure time as caused by the widening of the pin-receiving holes. Thus, the durability of focal plane shutter is attained accordingly. As the weight of the follower arms is reduced, the required charge energy is decreased also, which enables realization of a super-high speed shutter.

The present invention has improved durability as well as shutter speed.

What is claimed is:

1. A blade type focal plane shutter comprising:

a shutter base plate having an aperture, shutter blades each composed of a plural number of blade segments, and a driving mechanism having main arms and follower arms so rotatably connected to said shutter base plate and said blade segments as to form a parallel link mechanism, said main arms having pin-receiving holes in which driving pins are engaged respectively, the driving mechanism acting through said driving pins to move the respective blade segments of each blade between an aperture opening position in which said respective blade segments are folded up outside the aperture and an aperture closing position in which said respective blade segments are expanded to cover the aperture, and wherein the follower arms are made from material having lower rigidity and/or impact resistance than material from which the main arms are made.

2. A blade type focal plane shutter comprising:

a shutter base plate having an aperture, shutter blades each composed of a plural number of blade segments, and a driving mechanism having main arms and follower arms so rotatably connected to said shutter base plate and said blade segments as to form a parallel link mechanism, said main arms having pin-receiving holes in which driving pins are engaged respectively, the driving mechanism acting through said driving pins to move the respective blade segments of each blade between an aperture opening position in which said respective blade segments are folded up outside the aperture and an aperture closing position in which said respective blade segments are expanded to cover the aperture, and wherein the plate thickness of the follower arms is smaller than that of the main arms.

3. A blade type focal plane shutter comprising:

a shutter base plate having an aperture, shutter blades each composed of a plural number of blade segments, and a driving mechanism having main arms and follower arms so rotatably connected to said shutter base plate and said blade segments as to form a parallel link mechanism, said main arms having pin-receiving holes in which driving pins are engaged respectively, the driving mechanism acting through said driving pins to move the respective blade segments of each blade between an aperture opening position in which said respective blade segments are folded up outside the aperture and an aperture closing position in which said respective blade segments are expanded to cover the aperture, and wherein the follower arms have a lighter weight per volume than the main arms.

* * * * *